United States Patent [19]

Fryer et al.

[11] 3,964,964

[45] June 22, 1976

[54] IDENTIFICATION OF FAILED FUEL ELEMENT

[75] Inventors: Richard M. Fryer, Idaho Falls, Idaho; Robert G. Matlock, Hinsdale, Ill.

[73] Assignee: The United States of America as represented by the United States Energy Research and Development Administration, Washington, D.C.

[22] Filed: Oct. 15, 1974

[21] Appl. No.: 514,877

[52] U.S. Cl. .............................. 176/19 LD; 176/30; 176/37; 176/78; 176/80
[51] Int. Cl.² ......................................... G21C 17/04
[58] Field of Search ............... 176/19 R, 19 LD, 37, 176/80; 250/390; 73/19, 45.5; 251/323

[56] References Cited
UNITED STATES PATENTS

| | | | |
|---|---|---|---|
| 50,176 | 9/1865 | Simmons............................ | 251/323 |
| 256,510 | 4/1882 | Stephenson........................ | 251/323 |
| 1,198,956 | 10/1916 | Richardson et al................ | 251/323 |
| 2,154,255 | 4/1939 | Williams............................ | 251/323 |
| 3,300,388 | 1/1967 | Jerman et al...................... | 176/19 |
| 3,453,867 | 7/1969 | Webb et al. ....................... | 73/19 |
| 3,575,802 | 4/1971 | Gelius................................ | 176/19 |
| 3,733,249 | 5/1973 | Miller et al....................... | 176/19 LD |

OTHER PUBLICATIONS

AWL-7201 pp. 11-19.

*Primary Examiner*—Samuel W. Engle
*Assistant Examiner*—S. A. Cangialosi
*Attorney, Agent, or Firm*—Dean E. Carlson; Arthur A. Churm; Frank H. Jackson

[57] ABSTRACT

A passive fission product gas trap is provided in the upper portion of each fuel subassembly in a nuclear reactor. The gas trap consists of an inverted funnel of less diameter than the subassembly having a valve at the apex thereof. An actuating rod extends upwardly from the valve through the subassembly to a point where it can be contacted by the fuel handling mechanism for the reactor. Interrogation of the subassembly for the presence of fission products is accomplished by lowering the fuel handling machine onto the subassembly to press down on the actuating rod and open the valve.

1 Claim, 4 Drawing Figures

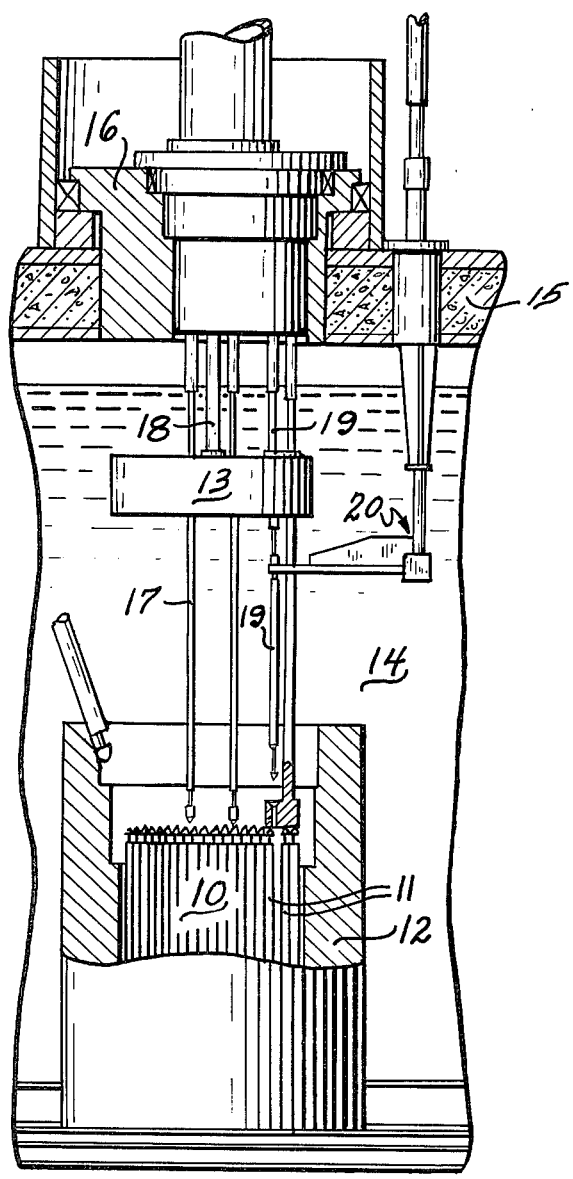
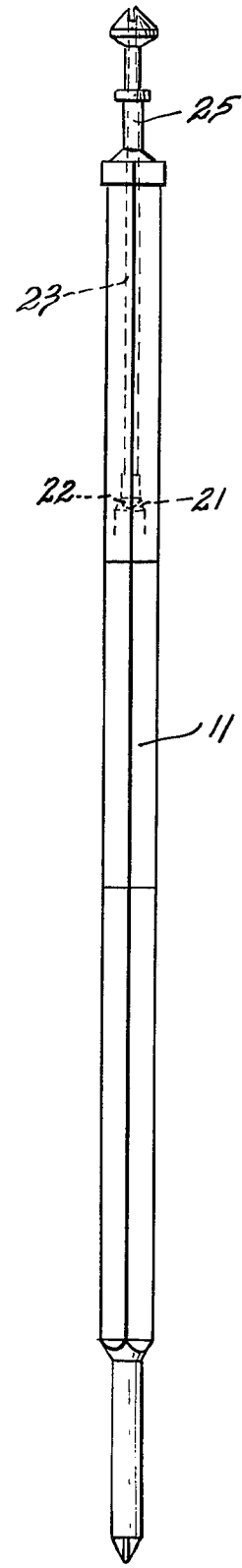

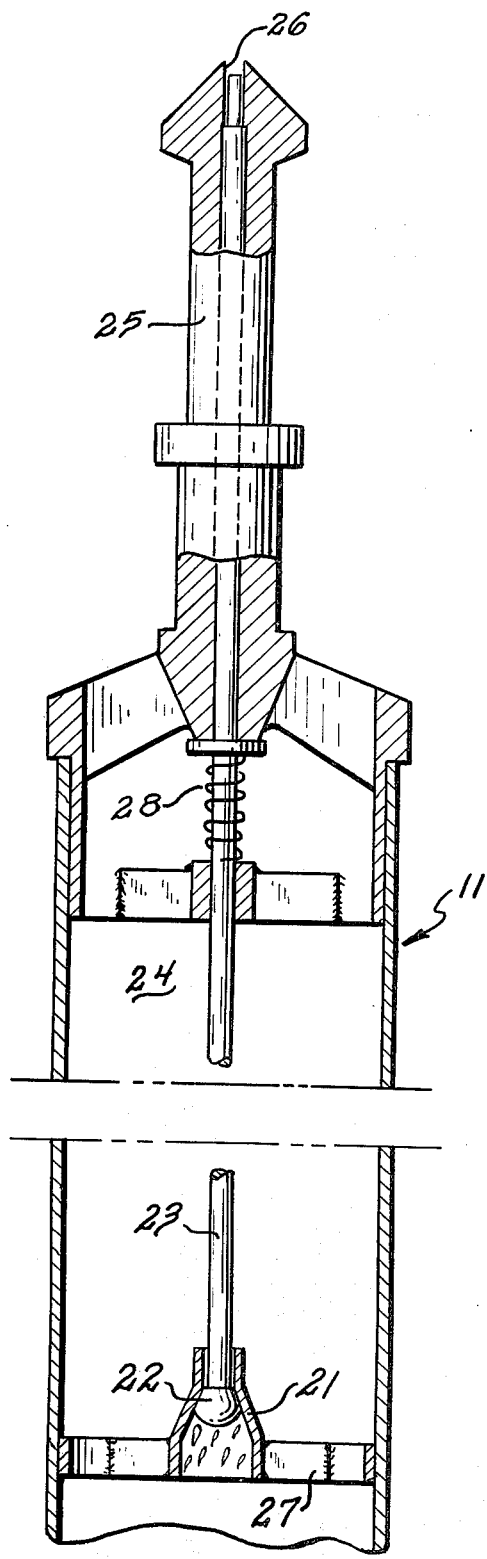
Fig-3
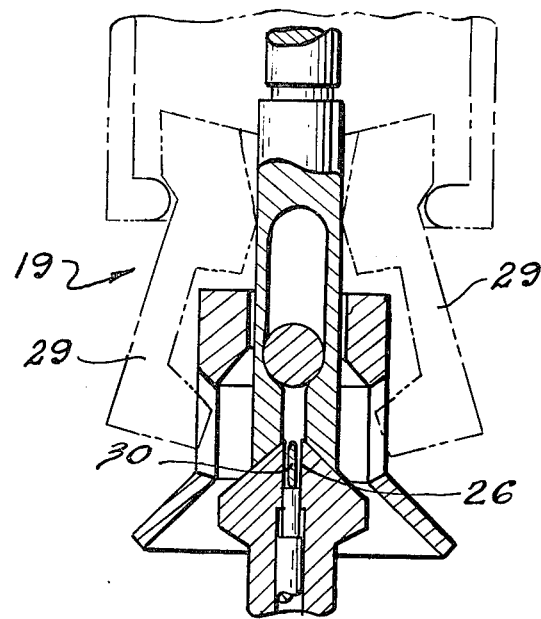
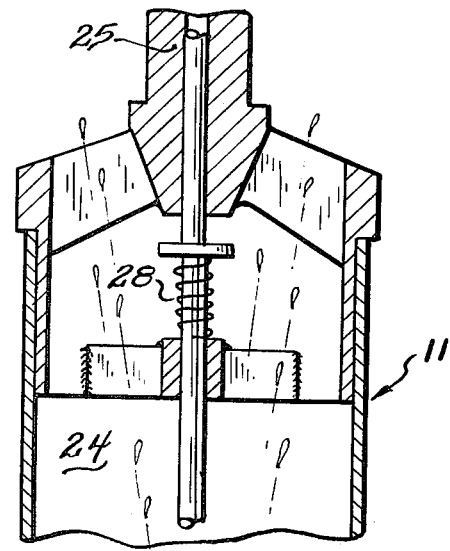
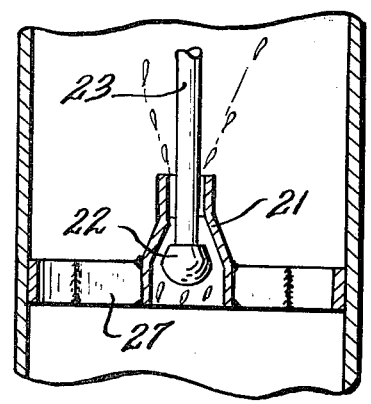
Fig-4

IDENTIFICATION OF FAILED FUEL ELEMENT

CONTRACTUAL ORIGIN OF THE INVENTION

The invention described herein was made in the course of, or under, a contract with the U.S. Atomic Energy Commission.

BACKGROUND OF THE INVENTION

This invention relates to the identification of defective fuel assemblies in liquid-metal-cooled fast breeder reactors. In more detail, the invention relates to apparatus for separately interrogating the fuel assemblies of a liquid-metal-cooled fast breeder reactor for a signal indicative of the presence of a failed fuel element therein. Specifically, the invention relates to an improvement in the Experimental Breeder Reactor No. 2 (EBR-II) whereby existing fuel handling equipment can be used to interrogate each subassembly in turn to determine whether a failed fuel element is present therein. EBR-II is described in ANL-5719 and addendum thereto, the Hazard Summary Report for the EBR-II, and the fuel unloading machine therefor is described in ANL-7201 and ANL-7585.

Since it is inevitable that cladding failures releasing fission gases to the coolant will occur during operation of fast breeder reactors and under certain conditions a clad rupture may dictate reactor shutdown so that the source can be removed from the active reactor core, identification of the subassembly having the cladding failure is essential. Operational possibilities for leak detection include 1. Cover gas analysis
  a. Gamma analysis
  b. Electrostatic discrimination
  c. Xenon tagging
2. Sodium analysis
  a. Gamma analysis of sparge gas
  b. Delayed neutron analysis Specific U.S. Pat. Nos. on leak detection include
1. 3,663,363 - Crouthamel et al. - Xenon Tagging
2. 3,234,101 - Berthod - A funnel is used to pick up an entraining gas which has picked up fission gases.
3. 3,453,867 - Webb et al. - Detecting means within the fuel assembly is used to detect fission gas in a funnel.
4. 3,575,802 - Gelius - Employs a fuel handling machine to assist in sampling coolant from fuel subassemblies sequentially and
5. 3,612,860 - Hackney - Sequentially tests samples of coolant from individual fuel assemblies.

Unfortunately, the identification of a failed subassembly in a reactor containing many fueled subassemblies using these known techniques is quite difficult, time-consuming and expensive.

SUMMARY OF THE INVENTION

According to the present invention, each fueled subassembly of a liquid-metal-cooled fast breeder reactor is provided with a fission product gas trap at the outlet end thereof. This may be an inverted funnel of less diameter than that of the subassembly, the funnel having a valve at the apex thereof. The valve is operated by an actuating rod which extends through the upper portion of the fuel subassembly and the adapter at the top thereof. The actuating rod is depressed and the valve opened by placing the fuel handling gripper of the fuel unloading mechanism over the upper adapter as in a normal fuel handling operation.

BRIEF DESCRIPTION OF THE DRAWINGS

The invention will next be described in connection with the accompanying drawings wherein:

FIG. 1 is a vertical view partly in section of so much of a nuclear reactor as is necessary to illustrate the present invention;

FIG. 2 is a vertical elevation of a fuel assembly therefor;

FIG. 3 is an enlarged vertical cross section of the upper part thereof showing the gas trap in closed position; and FIG. 4 is a similar view showing the gas trap in open position.

The present invention will be described as it would be applied to the EBR-II reactor and details of this reactor not found in the present drawing can be found in the ANL reports cited above. It is, of course, apparent that a failed element detection and location system according to the present invention could be incorporated in any fast reactor, although modifications to the reactor might be necessary.

Referring now to FIG. 1 of the drawing, the EBR-II is a sodium-cooled, pool-type fast reactor comprising a core 10 including a plurality of vertically disposed fuel assemblies 11 enclosed within a reactor vessel 12 having a movable cover 13, the cover being shown in raised position for fuel handling operations. Each fuel assembly 11 incorporates a bundle of fuel pins consisting of a nuclear fuel enclosed within gastight cladding. Reactor vessel 12 is submerged within a pool 14 of sodium contained within a primary tank (not shown) provided with a cover 15 having a rotating plug 16 therein through which extend control rods 17, reactor vessel cover 13 elevating column 18, and a gripper mechanism 19. Gripper mechanism 19 is capable of raising a fuel assembly 11 completely out of the reactor core 10 whereupon a transfer arm 20 is capable of transferring the assembly 11 to a storage rack (not shown) and ultimately to a transfer port (not shown) where the assembly can be removed from the reactor. Loading involves a reverse series of operations.

As shown in FIG. 2 and in more detail in FIGS. 3 and 4, a gas trap consisting of an inverted funnel 21, a normally closed valve 22 at the apex of the funnel and an actuating rod 23 attached to the valve 22 and extending axially upwardly through the upper plenum 24 of the fuel assembly. As in the EBR-II reactor, an upper adapter 25 provided with a locating slot 26 is attached to the top of the fuel assembly. The gas trap is supported in the upper portion of a fuel assembly several feet above the core region by a bracket 27. The diameter of the funnel 21 at its greatest is substantially less than that of the subassembly. A preferred size would be about 1.1 inches since an EBR-II subassembly is ~2.3 inches in diameter. The diameter could vary between about 0.7 inch and 1.2 inches, this being about ⅓ or ½ that of the subassembly. Actuating rod 23 extends upwardly through the adapter 25 and a short distance into locating slot 26 when valve 22 is closed. Spring 28 maintains the valve 22 in normally closed position.

Also shown in FIG. 4, mostly in phantom, is the lower end of gripper mechanism 19. This includes gripper jaws 29 and an orientation blade 30, which elements are present in the EBR-II gripper mechanism.

Identification of failed fuel elements according to the present invention is apparent from FIGS. 3 and 4. To interrogate a fuel assembly, gripper mechanism 19 is lowered onto adapter 25 as in a normal fuel handling operation, whereupon orientation blade 30 pushes downwardly on actuating rod 23. A downward motion of approximately 1/16 to 1/8 inch of the actuating rod 23 ensues. Any fission gases released in the fuel assembly will rise in the assembly and some will be trapped in the funnel 21, the remainder rising to the reactor cover gas to annunciate the fission product release. When a fission product release has been indicated, the gripper mechanism is lowered onto the adapter 25 of each of the fuel subassemblies in turn as described above. The downward motion of the actuating rod is sufficient to open the valve and release a bubble of fission product gas in every assembly in which a gas release has occurred. Conventional monitoring equipment can be used to detect the increase in reactivity in the cover gas caused by release of the bubble.

To estimate the sensitivity of the detection procedure according to the present invention, the change in cover gas signal-to-noise ratio was evaluated for a release yielding an original S/N ratio of 250 ($^{133}$Xe) from a 10 atom percent burnup element. A bubble occupying 1.1 cc at shutdown conditions in the trap would increase the signal 25% 2 days after the original release. The definition of signal-to-noise ratio is:

For a given index isotope, $^{133}$Xe, for example, the signal-to-noise ratio is the increase in $^{133}$Xe content in the reactor cover gas divided by the background $^{133}$Xe component in the cover gas from the unavoidable tramp uranium present in the reactor system.

The invention described above has the following apparent advantages:

1. The information storage mechanism is almost completely passive and with considered design should present no safety problems.
2. Retrieving the information stored in the gas trap can be accomplished with existing equipment, or at least existing reactor access facilities in an operating LMFBR.
3. Any or all subassemblies (with the exception of instrumented subassemblies) can be interrogated without perturbation or removal from the core, thereby eliminating extensive fuel handling operations associated with search and removal efforts.
4. Analysis of the information contained in the gas bubble can be accomplished with existing instruments.
5. The technique lends itself readily to moderate discrete steps in improvement; i.e. minor design changes in the gas trap, improvements in the method and delivery of the bubble to the cover gas, etc., can be performed independently as time and funds permit (for an operating reactor).
6. The technique does not depend on any method, whatever it may be, for inducing a secondary release from the leaking element.

The embodiments of the invention in which an exclusive property or privilege is claimed are defined as follows:

1. In a liquid metal cooled reactor having upward coolant flow and a plurality of vertically disposed fuel assemblies contained within a reactor vessel, each assembly having an outer closed sheath and a bundle of fuel pins consisting of a nuclear fuel enclosed within gas-tight claddings, a fuel handling machine including a gripper mechanism for grasping a handling adapter at the top of the fuel assemblies to remove and replace the fuel assemblies wherein said gripper mechanism includes gripper jaws at the lower end thereof, an orientation blade located therebetween, and the handling adapter includes an orientation slot at the top thereof, the orientation blade fitting in the orientation slot to establish the proper orientation of the gripper mechanism, said fuel handling machine being contained completely within said reactor vessel directly above the fuel assemblies:

a device for identifying failed fuel assemblies in their normal position within the reactor core, said device being within the outer sheath of each assembly and below the coolant level in the reactor vessel and comprising an inverted funnel of less diameter than that of the fuel assembly, disposed in each fuel assembly above the top of the fuel pins and including a normally closed valve at the apex thereof; and an actuator rod attached to the normally closed valve extending upwardly through the axial center line of the adapter at the top of each fuel assembly and into the orientation slot therein wherein operation of the gripper mechanism to grasp the handling adapter of a fuel assembly depresses the actuator rod to open the valve, thereby releasing any bubble of radioactive fission gas which may be accumulated in the funnel.

* * * * *